United States Patent [19]

Gaffney et al.

[11] 4,410,552

[45] Oct. 18, 1983

[54] COMPOSITE CONFECTION

[75] Inventors: Bernard J. Gaffney, Mohnton, Pa.; Terence W. Richardson, Oakland, Calif.

[73] Assignee: Godiva Chocolatier, Inc., New York, N.Y.

[21] Appl. No.: 306,497

[22] Filed: Sep. 28, 1981

[30] Foreign Application Priority Data

Aug. 13, 1981 [WO] PCT Int'l Appl. ........... US81/01082

[51] Int. Cl.³ .............................................. A23G 9/00
[52] U.S. Cl. .................................... 426/103; 426/572; 426/660; 426/571
[58] Field of Search ................ 426/103, 572, 660, 571

[56] References Cited

U.S. PATENT DOCUMENTS

| | | | |
|---|---|---|---|
| 2,082,312 | 6/1937 | Todd | 426/103 |
| 2,162,585 | 6/1939 | Musher | |
| 2,171,244 | 8/1939 | Otterbacher | 426/572 |
| 2,645,580 | 7/1953 | Schultz | |
| 2,847,311 | 8/1958 | Doumak et al. | |
| 3,556,812 | 1/1971 | Krohn et al. | 426/572 |
| 3,607,309 | 9/1977 | Olney et al. | |
| 4,038,423 | 7/1977 | Hayward et al. | |
| 4,045,583 | 8/1977 | Jeffery et al. | 426/103 |
| 4,049,832 | 9/1977 | Hayward et al. | 426/103 |
| 4,272,558 | 6/1981 | Bouette | |

FOREIGN PATENT DOCUMENTS 566718 11/1958 Canada.

Primary Examiner—Jeanette M. Hunter
Attorney, Agent, or Firm—Schuyler, Banner, Birch, McKie & Beckett

[57] ABSTRACT

A composite confection material suitable for incorporation as a center or filling in food products is provided. This composite material imparts enhanced mouth feel and taste properties to the food product by providing a dense first portion exhibiting intense flavor characteristics contiguously associated with a second portion of expanded fat-based material having a light fluffy texture and relatively less intense flavor characteristics as compared to the first portion. This material is particularly suitable as a center for chocolate candy products.

7 Claims, 1 Drawing Figure

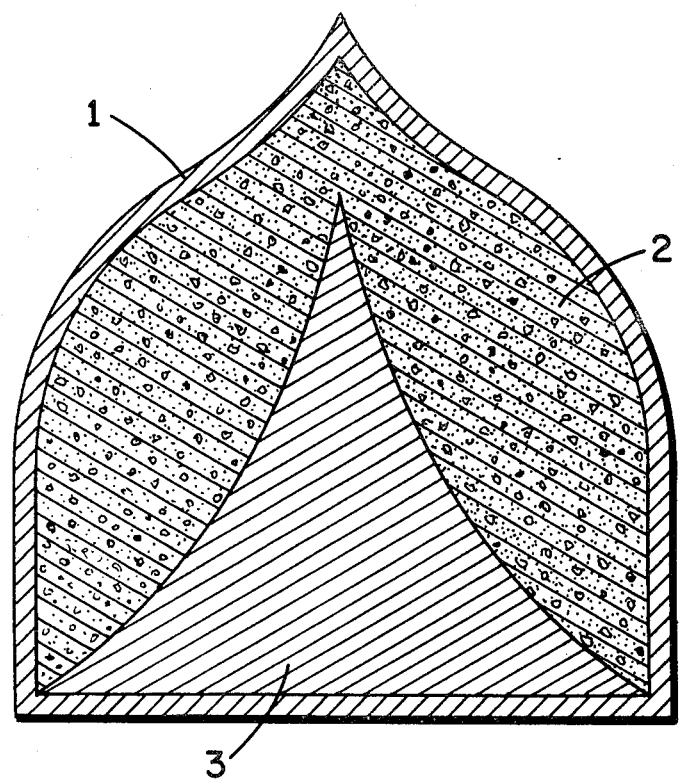

4,410,552

COMPOSITE CONFECTION

TECHNICAL FIELD

The present invention relates to novel composite food products exhibiting highly desirable taste and mouth feel properties. More particularly, this invention relates in its preferred form to composite products for incorporation into the center of chocolates, candies, candy bars and similar products.

BACKGROUND OF THE INVENTION

In food products generally, and particularly in confectionary products, the use of composite structures have been widespread. Candies, chocolates and the like often contain a filling or center of different material than the outer coating. The art has even employed multiple layers of materials arranged both laminarly and concentrically. The centers contained in chocolate products of the prior art are formulated from dense solids, aerated solids, creamy semifluid materials and even liquids.

The products of the prior art, however, have not been formulated to provide a composite center exhibiting sharply contrasting textural and flavor properties designed to enhance the mouth feel and eating characteristics of a product containing such a composite center.

SUMMARY OF THE INVENTION

It is therefore an object of the present invention to provide a food product having incorporated therein a composite material which imparts enhanced flavor and textural characteristics to the product.

A more specific object of this invention is to provide a chocolate confection comprising a composite center and an outer chocolate coating and which has improved flavor and textural characteristics.

These and other objects of the invention, which will readily occur to those skilled in the art, are achieved by providing a composite material suitable for incorporation into a food product to provide the food product with enhanced mouth feel and taste properties, this composite material comprising a first portion comprising a semiplastic confection having a density of from about 1.0 g/cm$^3$ to about 1.25 g/cm$^3$, this first portion exhibiting intense flavor characteristics and a second portion contiguously associated with the first portion, the second portion comprising an expanded fat-based material having a density of from about 0.2 g/cm$^3$ to about 1.0 g/cm$^3$, the second portion exhibiting relatively less intense flavor characteristics as compared to the first portion.

The present invention also provides a process for producing a composite material suitable for incorporation into a food product to provide the food product with enhanced mouth feel and taste properties, this process comprising the steps of (a) preparing a first portion comprising a semiplastic confection having a density of from about 1.0 g/cm$^3$ to about 1.25 g/cm$^3$, the first portion exhibiting intense flavor characteristics;

(b) preparing a second portion comprising an expanded fat-based material having a density of from about 0.2 g/cm$^3$ to about 1.0 g/cm$^3$, the second portion exhibiting relatively less intense flavor characteristics as compared to the first portion; and (c) forming the first and second portions into a composite material having at least one interface across which a significant contrast in mouth feel and taste properties can be perceived by a consumer of food products containing the composite material.

In the preferred form, the product of this invention can comprise a rich creamy chocolate core of high density and flavor intensity which core is coated, using coextrusion techniques, with a light aerated jacket of a whipped chocolate cream having a relatively low flavor intensity when compared to the core material. This unique structural arrangement permits the preparation of a product exhibiting unusually pleasing mouth feel properties after enrobing this composite center in conventional fashion with an outer chocolate coating. The resulting product exhibits, as a result of this structure, what can be likened to a surprise flavor bonus inside what the consumer will at first perceive as a chocolate-coated aerated product. The pronounced differences in flavor intensity and density of the two layers in this composite material serve to ensure that the consumer will be able to distinguish by mouth feel characteristics between these two materials.

BRIEF DESCRIPTION OF THE DRAWING

The FIGURE illustrates one preferred form of a confection product according to the present invention.

DETAILED DESCRIPTION OF THE INVENTION

The present invention relates to a composite food material intended to serve as an ingredient, filling or center of a food product. This composite material may be utilized in a great variety of edible products, such as candies, cookies, snack cakes, ice creams or other frozen dessert products and the like. For purposes of illustration only, this invention will be described primarily with regard to a preferred product, viz, a chocolate coated confection containing as a center the composite material of this invention. From this description, the nature of similar products containing the composite material of this invention and the manner of preparing these products will become readily apparent.

One embodiment of this preferred product form is illustrated in the FIGURE. This product comprises two basic components: an outer coating 1 and a composite center which includes intermediate layer 2 and core 3. Each of these materials will first be described separately.

Coating 1 can comprise any of the many outer jacket materials conventionally utilized in the preparation of coated candy products. Typically, these materials include various chocolate types, such as dutch chocolate, milk chocolate, white chocolate and the like as well as chocolate-type materials based on fats other than cocoa butter.

As indicated, the center of the illustrated product comprises a composite material consisting of core 3 and intermediate coating layer 2. It is important for full appreciation of the present invention to understand how the mouth feel characteristics of the overall product are affected by the particular structure and properties of this composite center. The anatomy and physiology of the human mouth permits the consumer of comestible materials to distinguish between differences in both flavor and texture during the biting and/or chewing processes. The manner in which a particular food product responds to these processes is generally referred to as the "mouth feel" of the product. Upon eating products containing one or more discrete areas of the composite material according to the present invention (e.g., the chocolate coated center of the illustrated embodiment), the consumer experiences a surprising and pleasing change in texture and flavor as he or she penetrates the light aerated portion and bites into the more dense and intensely flavored core.

From the foregoing discussion it will be appreciated that the selection of materials for each of the layers in the composite center can vary widely as long as the relative taste and texture properties of these materials are chosen to satisfy the objective outlined above. In addition, it is of course necessary to employ materials for the core and intermediate layer which are, or can be rendered, compatible and stable in contiguous relationship in the desired final product.

The core material is a dense semiplastic mass with a high level of flavor components. In the preferred embodiment, the core is also provided with a smooth creamy texture. Formulations of this nature presently employed in the candy industry may be utilized as the core material of the present invention. Typically, these compositions will contain sugar and/or corn syrup, and milk products (e.g., cream and/or milk solids) and a primary flavoring material. Among the widely used primary flavoring materials are chocolate, peanut butter, coffee and vanilla and various flavored liqueurs. Additional additives based on fruit or nut products and the like may also be employed. One preferred formulation based on chocolate flavoring contains sugar, corn syrup, invert sugar, heavy cream, sweetened condensed milk and tempered dark chocolate.

The core material should have a density in the range of from about 1.0 g/cm$^3$ to 1.25 g/cm$^3$. Preferred are core materials having a density of from about 1.1 g/cm$^3$ to 1.2 g/cm$^3$. The term "semiplastic" is intended to refer to the flow properties of the core mass. This term encompasses formulations which have product viscosities of from about 3,525 to 16,800 centipoise and preferably about 7,000 to 9,000 centipoise (at 100° F.). The core material can be prepared using conventional techniques as demonstrated in the examples.

The intermediate coating layer of the composite of the present invention should be a light aerated fat material having relatively less intense flavor characteristics than that of the core material. The term "aerated" is intended to refer to products which have an expanded structure due to the presence of discrete cells containing air or other gaseous materials.

In general, any aerated fat-containing material having a density in the range of from about 0.2 g/cm$^3$ up to about 1.0 g/cm$^3$ and preferably about 0.5 g/cm$^3$ to 0.9 g/cm$^3$ can be satisfactorily employed. The texture of such a product is light and fluffy in sharp contrast to the dense creamy core material. Preferred are formulations in which the primary fat is cocoa butter although other fats or mixtures of fats can be employed as long as at least a portion of the fat content is crystalline at room temperature to give the material the necessary body. It may be necessary to include in this formulation lower melting fats or oils in order to render the fat-based system plastic enough to effect the aeration or whipping step as described in more detail hereinafter. Thus, in one preferred formulation described in more detail in the examples, the intermediate layer can comprise a whipped chocolate plasticized with a mixture of lower melting fats and oils. Flavoring systems other than those based on nonfat cocoa solids can of course by utilized as long as they are compatible with the fat system in the formulation. Among such materials are so-called white chocolates.

The amount of flavor components in the intermediate layer should be carefully chosen to provide a material which has relatively less intense flavor characteristics than the core material. One particularly desirable way to tone down the richness of the chocolate flavors in a whipped chocolate product is to employ a modified aerated chocolate of the type described in commonly assigned copending application Ser. No. 306,498, entitled "Expanded Food Products", filed on even date herewith, in the name of Terence W. Richardson, which is hereby incorporated herein by reference.

One example of the whipped fat product described in the aforementioned application comprises a stable aerated mixture (emulsion) of an aqueous-based low-cooked sugar syrup mass and a soft fat-based mass.

The sugar component of the product of the present invention preferably is a low-cooked sugar syrup comprising mono- and/or disaccharides. Typically, mixtures of sucrose and corn syrup provide the best systems although either or both of these can be replaced in whole or in part by other sugars such as invert sugar and the like. Sucrose acts to impact sweetness to the composition and further effects the body and flow characteristics of the sugar syrup. Dextrose (from the corn syrup) serves to increase the solids content of the syrup and controls sucrose crystallization in a known manner. Corn syrup of any suitable dextrose equivalent (D.E.) normally used to make sugar syrup can be employed in the practice of this invention. By "low-cooked" applicant intends that the sugar syrup be heated to temperatures up to no more than about 240° F. Sugar syrups which can be satisfactorily utilized include the types normally used to prepare marshmallows and similar confectionary products, see, e.g., Otterbacher U.S. Pat. No. 2,171,244; Hayward U.S. Pat. No. 4,049,832; Olney U.S. Pat. No. 3,607,309; and Doumak U.S. Pat. No. 2,847,311, all incorporated herein by reference.

In the most preferred form, the separately prepared aqueous part of this system is similar in composition to a marshmallow product, and the fat part of the system is a whipped plasticized chocolate mass of the type described above. A stable mixture of these two materials is formed as described below. This mixture, which is to be used as the intermediate layer in the composite center of the present invention, typically can have the following general constituents in the indicated percents (by weight):

| fat component | 15–40% |
| sugar component | 20–60% |
| colloid | 0.1–10% |
| water | 6–20% |

Preferred are products containing the following amounts (by weight):

| fat component | 20–35% |
| sugar component | 30–40% |
| colloid | 0.1–5% |
| water | 10–15% |

The colloid is included as a stabilizer for the fine air cells introduced into the product by whipping. Among the suitable colloids useful in this invention are gums such as arabic, guar, locust-bean carrageenan, xanthan, tragacanth, methylcelluloses and the like; agar; alginates; pectins; starches; dextrine; and gelatins (varieties that are non-setting). Colloids such as settable gelatin are not required in this preferred formulation since the room temperature body of the mixture is contributed by the fat crystallinity. As indicated above, fat components based on materials other than cocoa butter can be employed if compatible with the remainder of the system, and as long as this fat component system has sufficient room temperature crystallinity to give the product requisite body. The fat components also include, if necessary, lower melting fats or oil to plasticize the primary fat so it can be easily whipped.

Optional ingredients in this mixture can include whipping agents, such as egg or soy albumins, lactalbumins and the like, and emulsifying agents to facilitate mixing of the aqueous and oily portions of the described product. In some cases mechanical action alone can promote sufficient aeration to obviate the need for whipping agents.

In general, the above-described whipped fat/sugar mixture exhibits novel structural and mouth feel properties which make it particularly suitable for use in the composite center materials of this invention. The mixture is neither cloying and sticky like a marshmallow nor rich and fatty like a whipped chocolate.

The process of making the intermediate layer material according to the present invention will now be described. Where this coating layer is fat-containing material without the above-described sugar syrup modification, the first step of the process involves melting the oily components of the fat system, e.g., chocolate and plasticizing fats or oils. This molten fat system is then cooled to a temperature of about 75° to 150° F. and preferably about 95° to 110° F. The cooled fat is then pumped through any suitable whipping apparatus in which air, nitrogen or the like is injected into the mass after being whipped. The fat system should be whipped to a density of from about 0.4 g/cm$^3$ to about 1.0 g/cm$^3$ and preferably to about 0.5 g/cm$^3$ to about 0.8 g/cm$^3$. One suitable piece of equipment for accomplishing this step is the Votator ® CR Mixer Model No. 81-085V available from Chemetron Corp. of Louisville, Kentucky. The resulting air (or gas) containing product is then pumped through a scraped surface heat exchanger to cool the product preferably to about 65° F.

In preparing the preferred intermediate layer containing a mixture of fat and sugar syrup ingredients, the procedure is somewhat different. The fat portion of this mixture is separately formulated and whipped as just described. In order to facilitate the subsequent blending of this oily material with the substantially aqueous-based sugar syrup portion, it may be desirable to incorporate an emulsifying agent into the fat portion before it is whipped as described above. Any of a wide variety of commonly used food grade emulsifiers can be utilized for this purpose. In general, a suitable emulsifier will have an hydrophilic/lipophilic balance (HLB) value of from about 2 to 8. One example of such an emulsifying agent is Atmul 124 which is a mono and diglyceride emulsifier sold by Atlas Chemical Industries of Wilmington, Delaware. As indicated above, this emulsifier may not be required in some product systems. It is also possible in some cases to incorporate such an emulsifying agent into the sugar syrup portion of the mixture.

The sugar syrup portion is also separately formulated and whipped. In the preferred manner of preparing this component of the mixture, sugar, corn syrup (62 D.E.) and water are boiled at a temperature of about 224° to 250° F. and preferably at about 230° to 240° F. After optionally cooling to about 98° to 205° F., a suitable colloid and, if necessary, a whipping agent (both described above) are added to the low-cooked sugar solution. This product is preferably subjected to beating as the syrup portion is being added. Beating is continued until the product exhibits a density of from about 0.2 g/cm$^3$ to 0.8 g/cm$^3$ and preferably 0.3 g/cm$^3$ to 0.5 g/cm$^3$. Any additional flavoring materials, such as vanilla essence, can be added after the beating step.

The final step in the process for making the fat/syrup mixture comprises carefully blending the two whipped aerated products. The relative amounts of aerated fat and aerated sugar syrup employed will of course vary widely with the product objectives but should be chosen to give a material having the composition generally set out above. The blending should take place with both components of the mixture at a temperature of from about 70° to 115° F. and preferably about 80° to 90° F. In practice, the components are optimally combined as soon as possible after their separate formation, although this is not required in all cases. The blending step should be effected in a mixer designed to impart very low shear forces to the product. Too much shear will result in losing the air (gas) in the expanded products being mixed. Equipment that affects a gentle folding of the components into a mixture is preferred. In order to further minimize air losses during blending, this step should be carried out as rapidly as possible on the "gentle" equipment. Typically, times of less than about 1 minute and preferably less than 30 seconds should be employed. In any event, the blending should be accomplished in the shortest amount of time and with the least amount of shear necessary to effect a complete mixing (i.e., produce a relatively homogenous mixture).

Having described the preparation of the various materials which make up the composite food product of the present invention, one embodiment of the process of actually forming this composite will now be described.

In the preferred form of the composite (i.e., a dense core coated with an aerated fat cream), the final fabrication step is preferably accomplished by known coextrusion techniques. This step can be performed on, for example, an OKA-Duplex-Depositor made by Otto Kremling Spezialmaschinenfabrik GmbH, Darmstadt, West Germany. In general, this type of equipment is provided with two separate product hopper and delivery systems which feed a single extrusion die. Care must be taken in both the product delivery and extrusion steps to avoid excessive working which causes the aerated fat cream material to lose air. After forming the co-extrudate, and cooling, this product can be fed to conventional chocolate enrobing equipment or otherwise incorporated into the final desired food product.

The particular dimensions of the composite material and relative proportions of dense core to aerated coating will of course vary widely depending on the type of final food product into which the composite is introduced. As a general rule, however, the relative thicknesses of the two materials should be such that the desired contrast in mouth feel properties will be significant. Thus, in the preparation of composite centers for use in chocolate candies, the core can vary from about 3 to 20 millimeters in diameter, preferably about 10 millimeters, while the thickness of the aerated coating can range from about 15 to 50 millimeters, preferably about 30 millimeters.

While the above description has been primarily directed to the formation of concentrically coated composites, it may be desirable in some instances to provide this composite in other coextruded or coformed geometries. Any such arrangement can be employed as long as the characteristic contrast in texture and taste properties can be perceived by the consumer. Accordingly, the two components can be co-deposited in any contiguous fashion such as side-by-side or in layers. It is also contemplated that more than two distinct materials of contrasting properties may be combined geometrically to achieve the enhanced mouth feel properties of this invention.

The following examples are intended to illustrate more fully the nature of the present invention without acting as a limitation on its scope.

EXAMPLE 1

This example demonstrates the preparation of a core composition suitable for use in producing a composite food product according to the present invention. The following ingredients, in the amounts shown, were combined with stirring, heated to 222° F. and cooled to 80° F.:

| heavy cream | 24 lbs. |
| --- | --- |
| sugar (medium fine) | 37.5 lbs. |
| corn syrup (42 D.E.) | 13.3 lbs. |
| invert sugar | 6 lbs. |
| sweetened condensed milk | 19.5 lbs. |
| salt | 2 oz. |
| lecithin | 1 oz. |

Ninety pounds of melted tempered dark chocolate was then added to the above formulation with stirring to achieve a homogenous product. The resulting product can then be cooled to room temperature if desired. This core material has a density of about 1.1 g/cm$^3$, a creamy semifluid room temperature consistency and an intense, rich chocolate flavor.

EXAMPLE 2

The procedures of Example 1 were repeated with the formulations modified to include the following flavor ingredients:
2A—peanut butter flavoring
2B—coffee flavoring
2C—vanilla flavoring
2D—hazel nut flavoring
The resulting products have texture properties similar to that produced in Example 1, but exhibit different taste properties.

EXAMPLE 3

This example demonstrates the preparation of a whipped fat material suitable for use as the intermediate layer in a composite food product according to the present invention. 17.5 lbs. of tempered dark chocolate (Guittard's French Vanilla) was melted to 120° F. and the following ingredients were added with stirring:

| Durkex 500 | |
| --- | --- |
| (An oil available from Durkee and having a melting point of about 72° F.) | 4.7 lbs. |

| -continued | |
| --- | --- |
| Cirol | |
| (An oil available from Durkee and having a melting point of about 91° F.) | 4.7 lbs. |

The resulting product was then cooled to about 115° F. and pumped through a CR Mixer provided with nitrogen injection (available from Votator Division of Chemetron Corporation) to whip and aerate the product. If the whipped product is to be used directly as described below, it can be cooled to about 65° F. in a scraped surface heat exchanger of the type available from the Votator Division of Chemetron Corporation. The resulting product has a density of about 0.65 g/cm$^3$, a light fluffy texture, and a relatively bland chocolate flavor.

EXAMPLE 4

This example demonstrates the preparation of a whipped fat/sugar amalgam suitable for use as the intermediate layer in a composite food product according to the present invention. The following ingredients were combined together and boiled to 235° F.

| sugar | 12.2 lbs. |
| --- | --- |
| corn syrup (62 D.E.) | 5.9 lbs. |
| water | 1.5 liter |

This mixture was then cooled to 170° F. In a separate step the following were combined in a Blakeslee mixer equipped with a wire whip:

| predissolved: | gum arabic | 1.9 lbs. |
| --- | --- | --- |
| | water | 0.7 liter |
| predissolved: | egg albumin | 8.6 oz. |
| | water | 0.5 liter |

The mixer was then started and the cooled syrup portion was added slowly. Beating of the mixture was continued until a density of about 0.4 g/cm$^3$ was reached. Finally 0.15 liter of vanilla essence was mixed into this product.

In a separate preparation step 17.5 lbs. of tempered dark chocolate (Guittard's) was melted to 120° F. and combined (with mixing) with the following:

| Durkex 500 | 4.7 lbs. |
| --- | --- |
| Cirol | 4.7 lbs. |
| Atmul 124 | 1.3 oz. |

The mixture was cooled to about 68° F. and beat for about 5 minutes to a density of about 0.65 g/cm$^3$. The temperature of this product was about 70° F.

In the final step of this procedure the whipped fat and syrup portions were combined by gentle folding over about 20–30 seconds. This combination took place at about 80°–90° F. and resulted in a product having a density of about 0.68 g/cm$^3$. The product has a soft light aerated creamy structure which is neither cloying and sticky like a marshmallow nor rich and fatty like an aerated soft chocolate.

EXAMPLE 5

This example demonstrates the preparation of a composite food product according to the present invention.

In this preparation a core material made according to Example 1 was combined with a whipped fat cream jacket made according to Example 3. These two materials were fed to the separate product hoppers of an OKA-Duplex-Depositor which was equipped with extrusion dies suitable for coextruding a product having the shape shown in the FIGURE. In the coextrusion process a creamy dense inner core was formed and this core was then coated with a light whipped jacket. The center thus produced was then enrobed with chocolate in the conventional fashion. The resulting product was a chocolate piece having a composite center which imparts to it the novel and exciting mouth feel characteristics described above.

EXAMPLE 6

The procedures of Example 5 are repeated utilizing the material of Example 1 as a core and the material of Example 4 as the whipped jacket. A confectionary product possessing excellent mouth feel and taste properties is produced.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A chocolate confectionary product having enhanced mouth feel and taste properties comprising an outer chocolate coating surrounding a composite center, said composite center having a core of semiplastic confection having a density of from about 1.0 to about 1.25 g/cm$^3$, said core being substantially coated with an expanded fat-based jacket having a density of from about 0.2 to 1.0 g/cm$^3$ wherein said jacket is a mixture comprising from about 15 to about 40% by weight of an edible fat component, said fat component comprising at least one fat which is solid at room temperature, from about 20 to about 60% by weight of a sugar component, from about 0.1 to about 10% by weight of a colloid and from about 6 to about 20% by weight of water, and wherein said core exhibits relatively intense flavor characteristics and said jacket exhibits relatively less intense flavor characteristics as compared to said core whereby the interface between said core and said jacket provides a significant contrast in mouth feel and taste properties which can be perceived by a consumer of said confectionary product.

2. The product of claim 12 wherein said core is flavored with a material selected from the group consisting of chocolate flavoring, coffee flavoring, peanut butter flavoring, vanilla flavoring, hazel nut flavoring and mixtures thereof.

3. The product of claim 1 wherein said jacket is a mixture comprising a whipped fat and a whipped low-cooked sugar syrup.

4. The product of claim 3 wherein said sugar syrup comprises sucrose, dextrose, a colloid and a whipping agent.

5. The product of claim 1 wherein said fat component comprises a plasticized chocolate material.

6. The product of claim 1 wherein said sugar component is selected from the group consisting of sucrose, dextrose and mixtures thereof.

7. The product of claim 3 wherein said whipped fat is a whipped chocolate.

* * * * *